United States Patent [19]

Blizzard

[11] Patent Number: 4,588,030
[45] Date of Patent: May 13, 1986

[54] WELL TOOL HAVING A METAL SEAL AND BI-DIRECTIONAL LOCK

[75] Inventor: William A. Blizzard, Houston, Tex.

[73] Assignee: Camco, Incorporated, Houston, Tex.

[21] Appl. No.: 655,481

[22] Filed: Sep. 27, 1984

[51] Int. Cl.[4] .................. E21B 23/00; E21B 23/02; E21B 33/00

[52] U.S. Cl. .................................. 166/120; 166/121; 166/123; 166/139; 277/124; 277/236

[58] Field of Search ............. 166/120, 121, 123, 125, 166/134, 138, 139, 181, 182, 187, 381, 382, 387; 277/123–125, 27, 30, 236, 205

[56] References Cited

U.S. PATENT DOCUMENTS

| | | | |
|---|---|---|---|
| 3,180,419 | 4/1965 | Cochran et al. | 166/120 |
| 3,378,269 | 4/1968 | Castor | 277/205 |
| 4,127,168 | 11/1978 | Hanson et al. | 166/123 |
| 4,131,287 | 12/1978 | Gunderson et al. | 277/236 X |
| 4,254,829 | 3/1981 | Watkins | 166/134 |
| 4,399,873 | 8/1983 | Lindsey, Jr. | 166/387 X |
| 4,473,231 | 9/1984 | Tilton et al. | 277/124 |

Primary Examiner—Stephen J. Novosad
Assistant Examiner—David J. Bagnell
Attorney, Agent, or Firm—Fulbright & Jaworski

[57] ABSTRACT

A well tool, for setting in a nipple having a locking notch, including a body with initially retracted first and second locking dogs with a threaded actuator for moving the first and second dogs axially relative to each other and into engagement with the top and bottom of the locking notch for preventing axial movement of the body in the nipple. A plurality of metal cup sealing rings positioned about the body and expandable into a sealing relationship between the body and the nipple by a piston. A tapered expander extends into each of the sealing cups and at least one of the rings is positioned with the cups directed oppositely to the cup in another ring for holding pressure in both directions. The cup rings are shaped for setting in a sequential order starting with the rings furthest from the piston. A protector sleeve is releasably connected to the body and initially encloses the locking dogs and the sealing rings.

22 Claims, 8 Drawing Figures

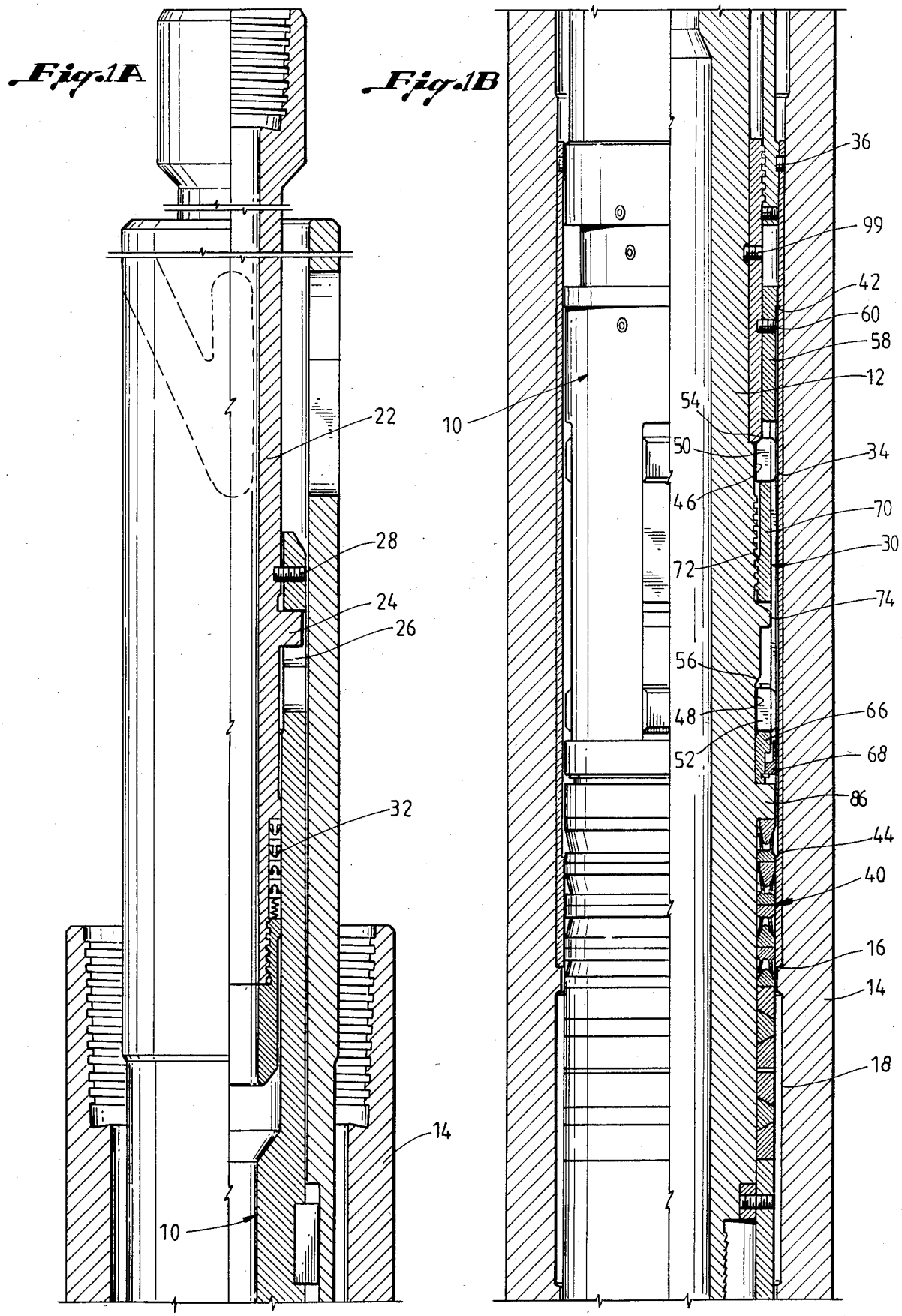

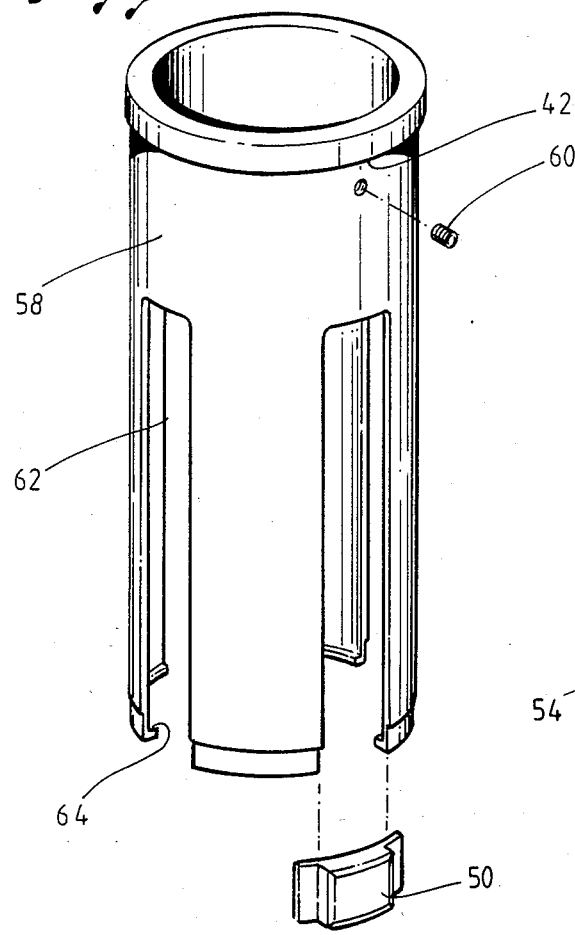
Fig.5
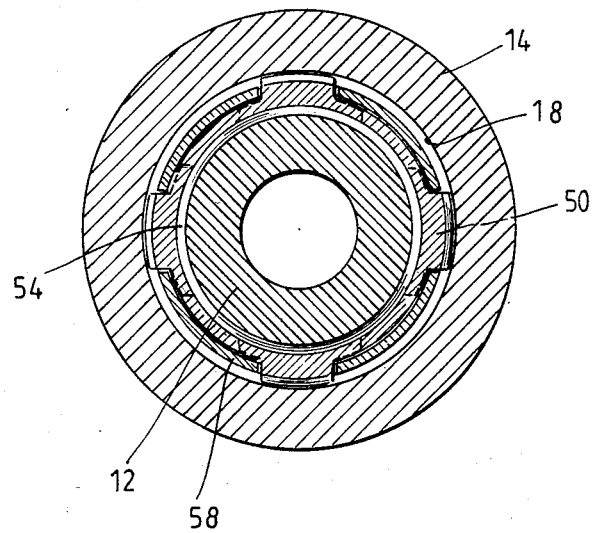
Fig.4
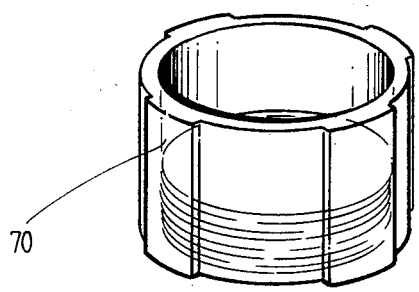
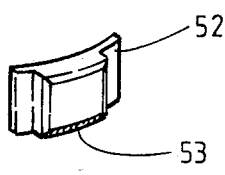

WELL TOOL HAVING A METAL SEAL AND BI-DIRECTIONAL LOCK

BACKGROUND OF THE INVENTION

As the oil and gas industry continues to drill deeper, higher pressures and temperatures are encountered. Conventional downhole well tools, which rely on elastomer components, are limited in their ability to overcome the pressures, temperatures and corrosive environment encountered in oil and gas wells.

The present invention is directed to a well tool having an improved metal seal for sealing between the well tubing and well casing. In addition, the present invention is directed to a well tool having a bi-directional lock which may be used to connect the well tool in a locking notch in the well casing and prevent axial movement of the tool either upwardly or downwardly. Such a metal seal and/or bi-directional lock is needed on various types of well tools such as packers, safety valves and subs.

SUMMARY

One feature of the present invention is directed to an improved metal seal for use in a well tool for sealing between an inner tubular member and an outer tubular member in which the seal includes at least one metal cup sealing ring positioned about the inner tubular member, and a tapered expander extending into each sealing cup for wedging the cup outwardly into a sealing relationship with both the inner and the outer tubular members.

Still a further object of the present invention is wherein the metal seal includes a plurality of sealing cup rings and tapered expanders wherein at least one of the rings is positioned with the cup directly opposite to the cup in another ring for holding pressure in both directions.

Yet a still further object of the present invention is the provision of a metal seal including a plurality of sealing cup rings and tapered expanders and including piston means adjacent one end of the plurality of rings which is adapted to expand the rings in which the cup rings are shaped for setting in a sequential order starting with the ring furtherest from the piston. The cups may be shaped in various ways to operate sequentially such as each successive cup having a progressively longer lip starting with the ring nearest the piston.

Still a further object of the present invention is the provision of a well tool having an inner tubular member, for locking in an outer tubular member which includes a locking notch, of initially retracted first and second spaced locking means on the inner member, means on the inner member for expanding the locking means outwardly, an actuating means for moving the first and second locking means axially relative to each other and into engagement with the top and bottom of the locking notch for locking the inner member against axially movement in the outer member.

A further object is the provision of a well tool having an inner tubular member for locking in an outer tubular member which includes a locking notch in which the inner member includes first and second spaced recesses, and first and second locking means are provided on the inner member initially retracted in the first and second recesses, respectively. Wedge surfaces are provided on the inner member for moving the first and second locking means outwardly on axial movement of the body relative to the first and second locking means and restraining means are telescopically movable relative to the inner member for restraining axial movement of the locking means as the body is moved for expanding the locking means outwardly. Actuating means including threaded means are provided for moving the first and second locking means axially relative to each other and into engagement with the top and bottom of the locking notch for locking the inner member in the outer member.

Still a further object of the present invention is the provision of a well packer, for setting in a nipple having a no-go shoulder and a locking notch, which includes a body having first and second spaced recesses with first and second locking means on the body initially retracted in the first and second recesses respectively. The locking means includes threaded actuating means for moving the first and second locking means axially relative to each other and into engagement with the top and bottom, respectively of the locking notch for locking the body against axial movement in the nipple. Metal cup sealing means are provided on the outside of the body for sealing between the inside of the nipple and the outside of the body. A protective sleeve is releasably connected to the body and initially encloses the locking means and the sealing means. Wedge surfaces on the body are provided for expanding the first and second locking means outwardly on axial movement of the body relative to the locking means and retaining means are telescopically movable relative to the body for restraining axial movement of the locking means as the body expands the locking means outwardly. Piston means are provided on the body adapted to set the sealing means in a sealing relationship between the nipple and the body.

Yet a still further object of the present invention is the plurality of shaped memory effect ring springs positioned between the piston and the sealing means for increasing the setting force on the sealing means upon an increase of temperature after the piston sets the sealing means.

Still a further object is the provision of means on the second locking means for limiting rotation of the locking means relative to the nipple.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIGS. 1A, 1B and 1C are continuations of each other and are elevational views, partly in cross section of a well packer utilizing the present invention shown in the running position, FIG. 4 is a cross sectional view taken along the lines 4—4 of FIG. 3B, FIG. 5 is an exploded view of the threaded actuator for the locking system of the present invention.

DESCRIPTION OF THE PREFERRED EMBODIMENT

While the present inventions will be described in connection with a well packer, for purposes of illustration only, it is to be noted that they may be used in connection with other types of oil and gas well tools.

Figure 1C:
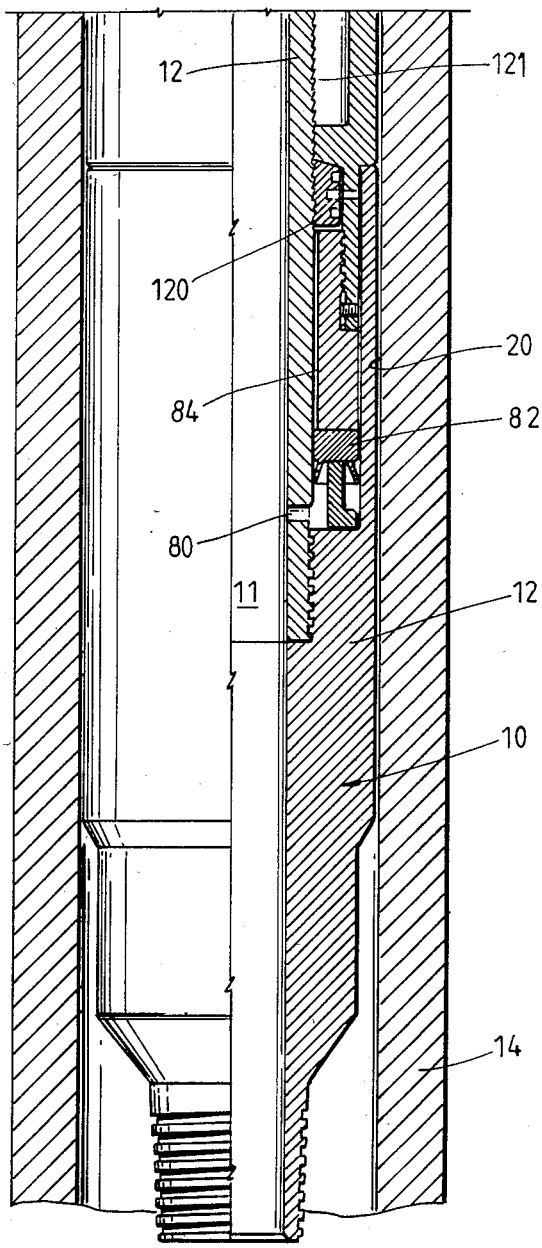

Referring now to the drawings, particularly to FIGS. 1A, 1B and 1C, the reference numeral 10 generally indicates a well packer or other well tool having an inner tubular member or body 12 which is adapted to be connected to a well tubing in an oil and/or gas well inside of a nipple 14 which is adapted to be connected to a well casing. It is to be noted that the nipple 14 includes a no-go shoulder 16, a locking notch 18, and preferably a polished bore 20 beneath the locking notch 18 for receiving seal means from the packer 10. The packer 10 is run into the nipple 14 and sets by a suitable setting tool 22. The packer 10 generally includes locking means generally indicated by the reference numeral 30 for locking in the locking notch 18 of the nipple 14 and metal seal means generally indicated by the reference numeral 40 for being expanded into a sealing relationship between the packer 10 and the polished bore 20 of the nipple 14.

Initially, the setting tool 22 is connected to the packer 10 through a typical lug 24 on the setting tool 22 and J-slot 26 in the packer 10 and secured by a shear pin 28 with a fluid seal 32, such as a metal seal, provided in the setting tool 22.

The well tool 10 preferably includes a protector sleeve 34 connected by a shear pin 36 to the body 12 for initially enclosing and protecting the locking means 30 and the sealing means 40 as the setting tool 22 lowers the packer 10 downwardly through the well. The packer 10 is lowered into the nipple 14 until, as best seen in FIG. 1B, the protector sleeve 34 encounters the no-go shoulder 16 in the nipple 14. A downward jarring of the packer 10 shears the pin 36 allowing the body 12 to be moved downwardly carrying the locking means 30 into general alignment with the locking notch 18 of the nipple 14 and carrying the sealing means 40 into alignment with the polished bore 20 of the nipple 14. That is, after the pin 36 is sheared, the body 12 moves downwardly until a downwardly directed shoulder 42 in the locking means 30 engages an upwardly directed shoulder 44 on the now stationary protector sleeve 34.

The body 12 of the packer 10, as best seen in FIG. 1B, includes first and second spaced recesses 46 and 48 for initially receiving first and second locking means such as dogs 50 and 52, respectively, in a retracted position. The body also includes wedge surfaces 54 and 56 adjacent the recesses 46 and 48, respectively, for expanding the first and second locking dogs 50 and 52 outwardly on axial movement of the body 12 relative to the locking means 30.

The locking means 30 as best seen in FIGS. 1B and 5 includes a lock housing 58 having the stop shoulder 42 and which is secured to the body 12 by shear pin 60. The housing 58 includes a plurality of elongated slots 62 through which the dogs 50 and 52 extend and in which the dogs 50 and 52 may be expanded outwardly by the wedge surfaces 54 and 56, on the body 12. The housing 58 also includes on its bottom end a shoulder 64 and retainers 66 and 68 which act to retain the lower dogs 52 and restrain them from longitudinal movement as the body 12 is moved downwardly. The locking mechanism also includes a nut 70 longitudinally slidable in the slot 62 and which threadably engages the body 12 by coacting threads 72 for axially moving the upper dogs 50 relative to the lower dogs 52.

Figure 3A:
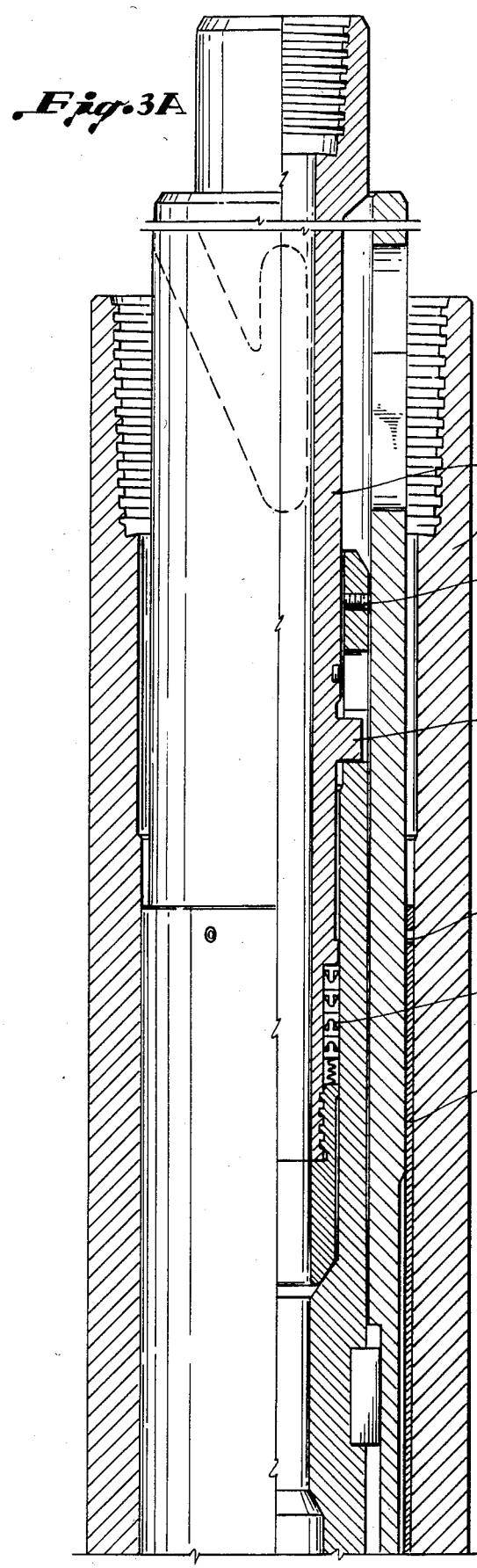
FIG. 3A and 3B are continuations of each other and are elevational views, partly in cross section, of the upper portion of the well packer shown in FIGS. 1A, 1B and 1C, but in the set position.
Figure 3B:
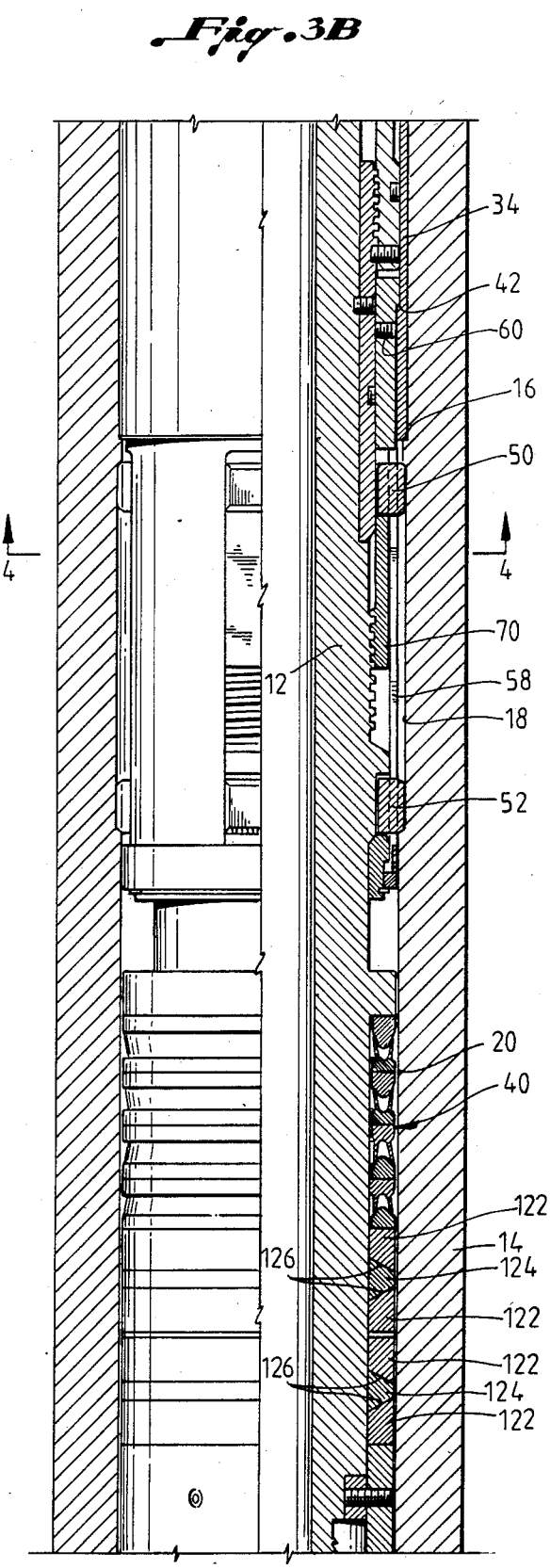

It is important that once the metal seal means 40 is set on the polished surface 20 in the nipple 14 that the sealing means 40 remain in a stationary position even under conditions of severe pressure reversible or thermal cycling which may occur in wells in service. Therefore, the locking means 30 expands the locking dogs 50 and 52 outwardly into the locking notch 18 of the nipple 14 and on right-hand rotation of the body 12, the locking dogs 50 are axially moved apart from the lower dogs 52 and the dogs 50 and 52 engage the top and bottom shoulders, respectively, of the recess 18 for locking the body 12 against axially movement either upwardly or downwardly in the nipple 14. That is, in operation the packer 12 moves downwardly through the nipple 14 until the protector shield 34 engages the no-go shoulder 16 on the nipple 14. Further downward movement shears pin 36 bringing the locking means into generally alignment with the locking notch 18 in the nipple 14. As the shoulder 42 encounters the shoulder 44 on the protector sleeve, further downward movement of the body 12 shears pin 60 and moves the wedge surface 56 downwardly under the lower dogs 52, moving the lower dogs 52 out into the locking notch 18 as best seen in FIG. 3B. Further downward movement of the body 12 brings shoulder 74 in to engagement with the expanded lower dogs 52 and further downward movement of the setting tool 22 shears pin 28 (FIG. 1A). Thereafter, right-hand rotation of the setting tool 22 rotates the body 12, and rotation of the threads 72 causes the nut 70 to move up in the slots 62 of the locking housing 58 carrying the upper set of dogs 50 outwardly over the wedge surface 54 and upwardly into engagement with the top end of the locking notch 18 while forcing the lower dogs 52 downwardly. Thus, as best seen in FIG. 3B, the body 12 is secured from moving axially up or down. In order to insure that the locking means 30 does not rotate as the body 12 is rotated, the bottom surface 53 of the lower locking dogs 56 may be provided with teeth or other suitable means for limiting rotation of the lower dogs 52 relative to the nipple 14.

Figure 2:
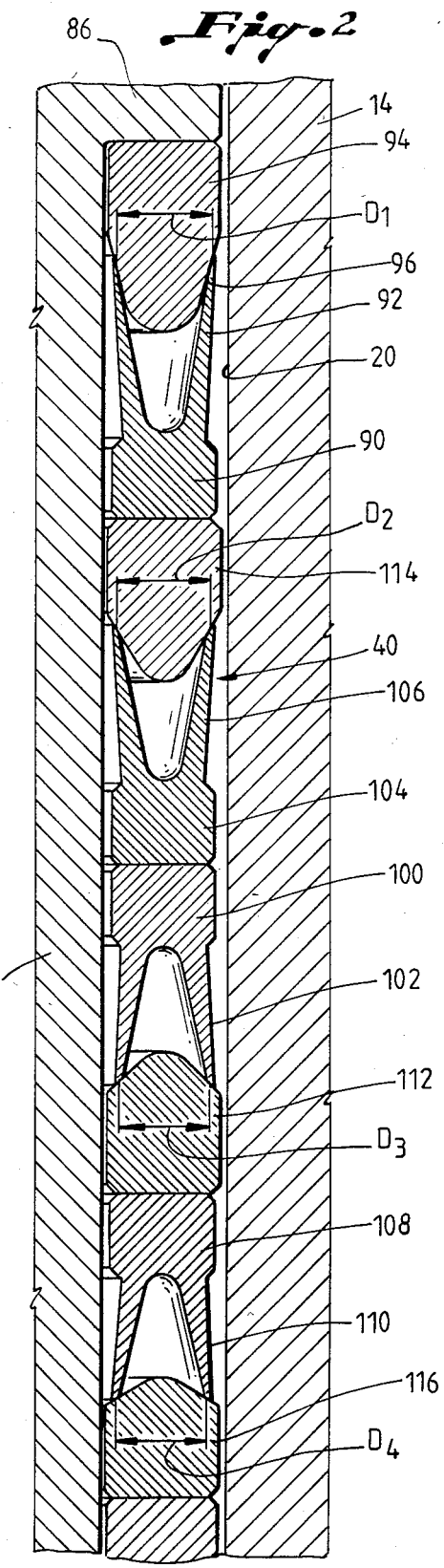
FIG. 2 is an enlarged fragmentary elevational view, in cross section, of the metal seal means of the present invention.

After the locking means 30 has been securely locked in the locking notch 18 of the casing 14, a plug provided in the bore 11 of the packer 10 and hydraulic fluid is applied to a port 80 (FIG. 1C) and against a metal cup piston 82 which in turn acts on a spacer 84 to compress and expand the metal cup sealing means 40 (FIG. 1B) between body shoulder 86 to seal between the exterior of the body 12 and the interior of the nipple 14. The sealing means 40, as best seen in FIG. 2, includes a metal cup sealing ring positioned around the outside of the body 12 such as metal sealing ring 90 having an outwardly directed cup seal 92 for being expanded outwardly against the polished section 20 of the nipple 14 and against the outside of the packer body 12. In order to insure that the lips of cup seal 92 are urged firmly into a sealing relationship with the surface 20 and body 12, an expander 94 having a tapered surface 96 which extends into the sealing cup 92 wedges the cup 92 outwardly as the piston 82 is actuated. Preferably, the sealing means 40 includes a plurality of sealing cup rings wherein at least one of the rings 100 has a cup 102 which is directed oppositely to the cup 92 for more securely holding pressure in both an upward and a downward direction. In addition, ring 104 with cup 106 and ring 108 with cup 110 may also be provided. Each of the rings 100, 104 and 108 include tapered expanders 112, 114 and 116, respectively.

Another feature of the sealing means 40 is that the various cup rings 90, 104, 100 and 108 are shaped for setting in a sequential order starting with the ring furtherest from the actuating piston 82. That is, it is important that the ring 90 set first and the rings 104, 100 and 108 sequentially set in that order. Otherwise, assuming that ring 108 would set first the ring 108 could be locked in position in a set position thereby preventing the remaining rings from setting and sealing. Various parameters may be utilized to insure that the rings set in the desired sequential order such as by varying the thickness of the lips in the cup, varying the flexibility of the lips in the cup, or by varying the material in the lips of the cup. Preferably, as best seen, sequential setting is obtained by making the lips of the cup of different lengths. Thus, the length of the lips in the cup 92 are longer than the length of the lips in the cup 106 which in turn are longer than the length of the lips in the cup 102 which in turn are longer than the lips in the cup 110. Thus, the distance D1 is greater than the distance D2 which is greater than the distance D3 which in turn is greater than the distance D4 thereby insuring that the cup 92 will be flexed outwardly into a sealing relationship prior to the other rings 104, 100 and 108. After the rings are expanded outwardly into a sealing relationship, the ratchet 120 engages ratchet teeth 121 on the body 12 (FIG. 1C) to securely lock the metal cup sealing means 40 in a sealed position.

While the metal cup sealing means 40 are shown in the particular embodiment of the present invention in use with a well packer, they may be advantageously used in any type of well tool requiring an expandable seal for sealing between an inner tubular member and an outer tubular member.

Another feature of the present invention is the incorporation in the setting mechanism of a combination of shaped memory effect ring springs 122 and 124 such as are sold under the trademark NITINOL and are coacting wedge-shaped members having coacting tapered surfaces 126 therebetween. For example, one of the members, such as 122, may be of nickel titanium and the other members 124 may be of any suitable metal such as stainless steel. The ring springs 122 and 124 are located between the setting piston 82 and the metal cup sealing means 40. In this location, the axial force generated by the metal piston 82 is transmitted to the wedge-shaped rings 122 and 124 to the metal sealing means 40. Upon compression by the piston 92, the members 122 and 124 are diametrically deflected out and against the inner surface of the nipple 14 and outer surface of the body 12 and deformed. The axial setting force of the piston 82 is locked in by the ratchet 120 during the setting of the seal means 40. Once the packer is put into service, a temperature rise will force the shape memory effect rings 122 to utilize their unique property by undergoing a transformation of their overall crystal structure, acting to return the ring springs 122 to their original shape. However, since the ring springs 122 and 124 are trapped between the piston 82 and the sealing means 40 by the ratchet 120, the ring springs 122 in attempting to return to their original shape, exert a great amount of additional axial force which is applied to the metal seal means 40 to increase the sealing effect of the metal seal means 40 and enabling a greater pressure differential to be maintained by the seal means 40. The shape memory effect ring springs 122 and 124 may be advantageously used in other types of well tools for increasing the pressure on a seal between an inner tubular member and an outer tubular member.

In the event that it is desired to retrieve the packer 10 from the nipple 14, a pulling tool similar to the setting tool 22 may be reconnected to the body 12 and apply a straight pull loading for shearing pin 99 (FIG. 1B) for allowing the dogs 50 and 52 to retract thereby releasing the packer 10 from the nipple 14.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will readily suggest themselves to those skilled in the art and which are encompassed within the spirit of the invention and the scope of the appended claims.

What is claimed is:

1. A well packer for setting in a nipple having a no-go shoulder and a locking notch comprising,
   a body,
   initially retracted locking means on the body, said means including actuating means for moving the locking means axially into engagement with both the top and bottom of the locking notch for locking the body against axial movement in the nipple,
   metal cup sealing means on the outside of the body for sealing against the inside of said nipple, and
   piston means on the body adapted to set the sealing means in a sealing relationship between the nipple and the body.

2. The apparatus of claim 1 including,
   a protector sleeve about the body initially enclosing the locking means and the sealing means.

3. The apparatus of claim 1 wherein the locking means includes,
   spaced upper and lower dog means and thread means for moving the spaced dog means apart into a locked position.

4. The apparatus of claim 3 including,
   means on the lower dog means for limiting rotation of the lower dog means relative to the nipple.

5. The apparatus of claim 1 wherein the body includes wedge surfaces for expanding the spaced dog means outwardly on axial movement of the body relative to the spaced dog means, and
   first and second shoulder means positioned between the spaced dog means, and one of said shoulder means being threadedly connected to the body.

6. The apparatus of claim 1 wherein the sealing means includes,
   a plurality of sealing cup rings wherein at least one of the rings are positioned with the cup directed oppositely to the cup in another ring for holding pressure in both directions.

7. The apparatus of claim 1 wherein the sealing means includes,
   a plurality of sealing cup rings and a tapered expander extending into the sealing cup of each ring for wedging the cups outwardly into a sealing relationship.

8. The apparatus of claim 7 wherein the cup rings are shaped for setting in a sequential order starting with the ring furtherest from the piston.

9. The apparatus of claim 8 wherein at least one of the rings is positioned with the cup directed oppositely to the cup in another ring for holding pressure in both directions.

10. The apparatus of claim 1 wherein the sealing means includes,
at least one metal cup sealing ring and a tapered expander extending into the sealing cup for wedging the cup outwardly into a sealing relationship.

11. The apparatus of claim 1 including,
a plurality of shape memory effect ring springs positioned between the piston and the sealing means for increasing the setting force on the sealing means upon an increase of temperature after the piston sets the sealing means.

12. A well packer for setting in a nipple having a no-go shoulder and a locking notch comprising,
a body having first and second spaced recesses,
first and second locking means on the body initially retracted in the first and second recesses, respectively, said means including threaded actuating means for moving the first and second locking means axially relative to each other and into engagement with the top and bottom, respectively, of the locking notch for locking the body against axial movement in the nipple,
metal cup sealing means on the outside of the body for sealing between the inside of said nipple and the outside of the body,
a protector sleeve releasably connected to the body and initially enclosing the locking means and the sealing means,
wedge surfaces on the body for expanding the first and second locking means outwardly on axial movement of the body relative to the first and second locking means,
retaining means telescopically movable relative to the body for restraining axial movement of the locking means as the body is moved for expanding the locking means outwardly, and
piston means on the body adapted to set the sealing means in a sealing relationship between the nipple and the body.

13. The apparatus of claim 12 including,
means on the second locking means for limiting rotation of the locking means relative to the nipple.

14. The apparatus of claim 12 including,
a plurality of shape memory effect ring springs positioned between the piston and the sealing means for increasing the setting force on the sealing means upon an increase of temperature after the piston sets the sealing means.

15. The apparatus of claim 12 wherein the sealing means includes,
a plurality of sealing cup rings and a tapered expander extending into the sealing cup of each ring for wedging the cups outwardly into a sealing relationship.

16. The apparatus of claim 15 wherein at least one of the rings is positioned with the cup directed oppositely to the cup in another ring for holding pressure in both directions.

17. The apparatus of claim 16 wherein the cup rings are shaped for setting in a sequential order starting with the ring furthest from the piston.

18. In a well tool having an expandable seal for sealing between an inner tubular member and an outer tubular member, the improvement in a metal seal comprising,
a plurality of metal cup sealing rings having tapering lips positioned about the inner tubular member,
a plurality of tapered expanders one of which extends into each sealing cup and engaging the lips for wedging the lips outwardly into a sealing relationship with both the inner and the outer tubular members,
piston means adjacent one end of said plurality of rings for moving the expander and sealing ring together for wedging the lips outwardly, and
said cup rings shaped for setting in a sequential order starting with the ring furthest from the piston.

19. The apparatus of claim 18 wherein the cups are shaped to operate sequentially by each successive cup having a progressively longer tip starting with the ring nearest the piston.

20. In a well tool having an inner tubular member for locking in an outer tubular member which includes a locking notch, the improvement in locking means for locking the inner member to the outer member for preventing axial movement of the inner member relative to the outer member comprising,
initially retracted first and second spaced locking means on the inner member,
means on the inner member for expanding the locking means outwardly, and
actuating means for moving the first and second locking means axially relative to each other and into engagement with the top and bottom of the locking notch for locking the inner member against axial movement in the outer member.

21. In a well tool having an inner tubular member for locking in an outer tubular member which includes a locking notch, the improvement in locking means for locking the inner member to the outer member for preventing axial movement of the inner member relative to the outer member comprising,
said inner member having first and second spaced recesses,
first and second locking means on the inner member initially retracted in the first and second recesses, respectively,
wedge surfaces on the inner member for moving the first and second locking means outwardly on axial movement of the body relative to the first and second locking means,
restraining means telescopically movable relative to the inner member for restraining axial movement of the locking means as the body is moved for expanding the locking means outwardly, and
actuating means including threaded means for moving the first and second locking means axially relative to each other and into engagement with the top and bottom, respectively, of the locking notch for locking the inner member against axial movement in the outer member.

22. The apparatus of claim 21 wherein the second locking means includes means for limiting rotation of the lower locking means relative to the outer member.

* * * * *